United States Patent [19]
Casale

[11] Patent Number: 5,195,893
[45] Date of Patent: Mar. 23, 1993

[54] SHAPE RETAINING STENCIL FOR THREE DIMENSIONAL IMAGE PLACEMENT

[76] Inventor: Angelo J. Casale, 74-02 Thirteenth Ave., Brooklyn, N.Y. 11228

[21] Appl. No.: 639,114

[22] Filed: Jan. 9, 1991

[51] Int. Cl.$^5$ .............................................. G09B 11/00
[52] U.S. Cl. ....................................... 434/87; 434/85; 33/565
[58] Field of Search ...................... 434/87, 85, 95, 96, 434/97; 33/561.1, 561.2, 565, 564, 563, 562, 21.2

[56] References Cited

U.S. PATENT DOCUMENTS

| | | | |
|---|---|---|---|
| 645,440 | 3/1900 | Thruston | 434/95 |
| 2,156,279 | 5/1939 | Drew | 33/563 X |
| 3,364,598 | 1/1968 | Cook | 434/87 X |
| 4,430,416 | 2/1984 | Goto et al. | 430/263 |

FOREIGN PATENT DOCUMENTS 1145243  3/1985  U.S.S.R. ................. 33/565

Primary Examiner—John J. Wilson
Assistant Examiner—Jeffrey A. Smith
Attorney, Agent, or Firm—Gary Cohen

[57] ABSTRACT

A guide is disclosed, for the placement of images on non-flat objects and surfaces, useful in schools, business, industry and homes, of a moldable, shape-retaining material on which have been placed a plurality of holes defining a pattern, the material is fit against the non-flat object, marks are made through the holes of the sheet as a stencil directly onto the non-flat surface, after which the dots are connected to provide the pattern on the surface. Words, letters, faces, cartoons, any image, can be placed uniformly upon a number of such objects, which can be balloons, paper cups, pipes, walls, or any non-flat surface. The guide can be a foil, a sheet, a fabric, with or without supplemental shape-retainment structure or material content.

16 Claims, 1 Drawing Sheet

SHAPE RETAINING STENCIL FOR THREE DIMENSIONAL IMAGE PLACEMENT

BACKGROUND OF THE INVENTION

The invention concerns stencils and guides, in general, but more specifically, a guide for quick and easy placement of a pattern onto non-flat surfaces.

According to one particular embodiment of the present invention, a mask or guide is provided which enables one to easily place a pattern, for example, a face, onto the surface of an inflated balloon.

With the guide according to the present invention, one is not limited to a particular shape or size of balloon, in this particular embodiment.

The use of a pattern or stencil to simplify marking of an image onto a surface is well known. Not only does the guide make it easier for the image to be applied—it also allows for the operation to be repeated a number of times with a plurality of the surfaces, each time providing an image that is of uniform quality from piece to piece.

Stencils or templates are useful in the academic world as well as the commercial and business world. They are used to place images on paper, cardboard and other paper products, both flat and shaped. For example, paper cups as well as paper signs are employed as surfaces for the placement of images by means of a guide or stencil. They are used with sheet metal and pipes, among other metal goods, when markings have to be applied onto surfaces, both in the manufacturing stages and in the finishing stages, as well as with finished goods. Plastics, wood products, stone and composite materials, such as for example plaster of Paris or cement, rubber goods, textile fabrics, synthetic fabrics, in short, any physically solid material of which goods are made, are used with stencils or guides when the placement of an image upon a surfaces is desired.

Most commonly, stencils or patterns are employed with flat surfaces, such as for example the well-known cardboard stencil used by students, artists and secretaries for lettering, or the likewise well-known paper patterns for the making of clothing. It is a major problem with the use of most common guides such as these that they cannot be used to mark patterns or lettering on non-flat surfaces, or if they can, it is only with a great deal of difficulty. They guides that are made of non-flexible materials, such as for example the well-known 12-inch rulers with lettering patterns punched out, which are usually made of wood or plastic, clearly could not be used to apply letters to an iron pipe or a latex balloon without a great deal of difficulty.

Another disadvantage of the known guides and stencils is the fact that one is limited to the sizes, shapes or images provided by the manufacturers. Using lettering stencils as an example, it might not be easy to locate a stencil for, let us say, italicized gothic style Russian. Were a stencil or guide available that allowed one to cut out any desired shape or image, then it would be limited in use to the chosen shape or image. Except to the extent that a further shape or image could be cut out from the unused portions of the stencil, one shape or image per stencil would be the general limitation. One could not use the same area of a stencil for a different shape or image again and again and again.

SUMMARY OF THE INVENTION

It is therefore an object according to the present invention to provide a guide for image placement for use with non-flat surfaces that allows one to obtain images of uniform quality from piece to piece.

It is a further object according to the present invention to provide a guide for image placement that allows the user to design his or her own shapes or images to be applied onto the non-flat surfaces.

An additional object according to the present invention is to allow the user to design his or her own stencil or guide without having to cut away areas of the stencil or guide. Moreover, the stencil should be re-usable again and again for different shapes or images.

These objects are accomplished according to the present invention by a flexible, moldable or malleable and shape-retaining guide for the placement of images, made up from a sheet of flexible, moldable, shape-retaining material on which a figure, e.g. a clown's face, has been drawn, holes have been made in the sheet at a plurality of points defining the figure or pattern, and the sheet has been molded to the contour of a non-flat object that is the object upon which the pattern is to be applied.

Throughout the specification, guide, stencil, template, among others, have been used to describe the invention. The term guide will be used for now on to describe the same.

By using, for the guide, a sheet of metal, metal foil, plastic, plastic foil, metal-plastic composite or metal-plastic composite foil, a degree of shape-retaining ability is inherent from the physical character of the material, and further provision for shape-retainment may be unnecessary, depending upon the physical character of the non-flat object which is to be stencilled. For example, if a wooden cylinder is to be stencilled, a guide made from a thin sheet of synthetic plastic material, heat-fixable such as e.g. vinyl or polyacrylate, or from tin foil, is easily molded to the contour of the block. On the other hand, if a more fragile object is to be stencilled, such as for example an inflated balloon or a delicate China doll, a guide made from a softer material is more suitable. Since a softer material has less inherent shape-retaining ability, further shape-retaining means are often needed to supplement whatever degree of shape-retainment is provided by the material.

Softer materials include, by way of example, synthetic film, such as in particular photographic film material or even polyethylene or polypropylene gauze, composite synthetic film, reinforced synthetic film, sizing material, coated fabric or impregnated fabric, latex, among others.

According to a particular embodiment of the present invention, guides made from buckram are suitable for stencilling fragile objects.

When the inherent shape-retaining ability of the sheet material employed for the guide according to the present invention has to be supplemented by some further manner of shape-retainment, this is achieved according to the present invention by a content in the flexible sheet material of glue, starch, flour, among others, providing once wetted a decrease in the inherent flexibility and moldability of the material.

In addition, thin wires or filaments of metal, plastic, or any of the materials useful in general for the sheet itself, when contained on or by the sheet, add to the inherent shape-retaining character of the sheet material.

Vinyl, polypropylene, polyethylene, polyethylene terephthalate, polyester, polyacrylate, and cellulose compounds, to name a few, are materials useful according to the present invention for the sheet material and any support structures, such as for example, wires or filements.

Fabric, gauze or sizing material, mentioned above, may be of any suitable material, including for example, polyester, nylon, viscose, dacron, cotton, celluose and latex.

The use of thin wires or filaments, or other support structures to supplement to natural shape-retaining ability of the material employed for the guide is in no way limited to the less shape-retaining materials disclosed by way of example for use in particular with more fragile objects. Again, depending upon the object to be stencilled, even the metal or plastic guides, for example, may have to be supplemented by further shape-retaining structure or content.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
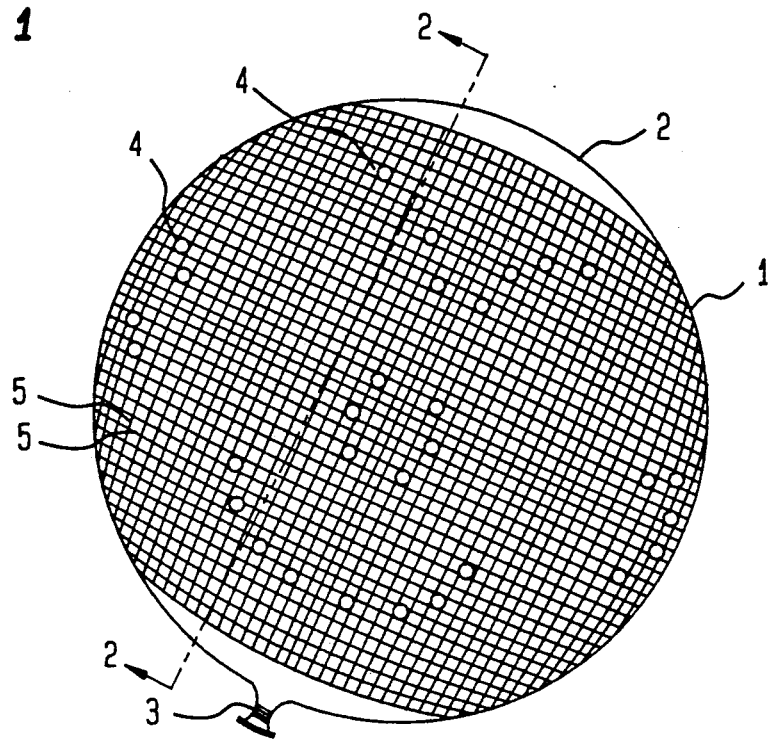
FIG. 1 is a front, prespective view of a guide according to the present invention, embodied as a shaped sheet of buckram, placed upon an inflated balloon as an object to be stencilled.

In the embodiment shown in FIG. 1, reference numeral 1 is the flexible, moldable and shape-retaining guide, made out of a sheet of buckram. Inflated balloon 2 is the object upon which a face of a clown is to be stencilled. The balloon 2 is closed off by any known means, such as a knot 3, a clamp, a plug, a clip, among other closure means.

Figure 2:
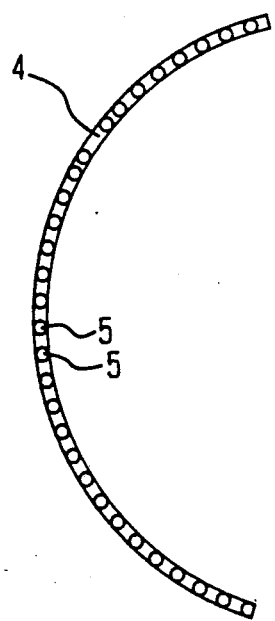
FIG. 2 is a cross-section through line 2—2 of FIG. 1 of the guide according to the present invention.

The guide 1 of buckram, which is a coarse cotton or cellulose-base (or any other suitable fiber structure) fabric, heavily sized with glue, flour, starch or any other additive which, after having been wet, dries and thereby somewhat stiffens the fabric, so as to supplement its natural shape-retaining ability, according to this embodiment, is thoroughly wet and then shaped to the non-flat surface of inflated balloon 2. It is then allowed to dry. Once dry, guide 1 retains substantially the shape of inflated balloon 2. This greatly simplifies the placement of the guide onto any number of other inflated balloons which are to be likewise stencilled. In addition, the guide 1 then acts as a sizing caliper, assuring a uniform degree of inflation of a plurality of balloons to be stencilled. Moreover, guide 1 indicates to the operator exactly when during each balloon inflation procedure the balloon is completely inflated and that step of the procedure is finished. FIG. 2 shows the curvature of the guide.

Either before or after the guide 1 is wet and shaped to the balloon 2, a pattern is lightly sketched onto its surface. Then, using a pencil, stylus, metal punching tool or the like, at a plurality of points throughout the pattern, holes 4 are made in the guide, by simply pressing the pencil into the already-present spaces between fibers 5 so expanding the same. The holes that are made in the guide need not be very large. They should be large enough to stand out visually from the natural spacing between the fibers of the fabric, and also so that a marking pen, paint brush, crayon or the like, used thereafter for applying the pattern through the guide onto the object to be stencilled, can easily make contact with the latter.

Depending upon the skill of the person who is drawing the pattern to be employed, either by hand or by way of a machine interposed between the artist and the medium, the step of sketching the pattern onto the surface of the guide can be omitted, and the hole-making tool becomes the means for effecting the sketch, during the hole-making step, in addition to its normal function.

Figure 3:
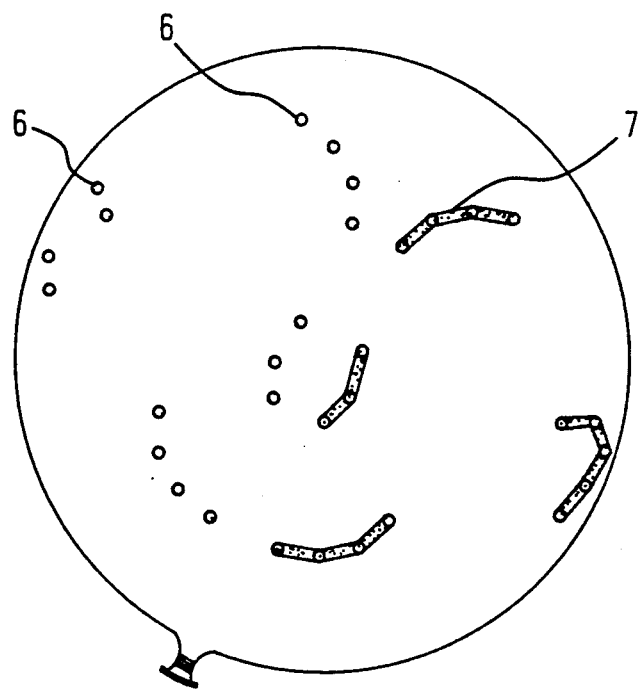
FIG. 3 is the same as FIG. 1, however with only the inflated balloon, showing thereon a plurality of marks placed through the guide according to the present invention, on the left half, and a completed pattern drawn through such marks, on the right half.

Once the dots or marks have been made on the balloon surface, using the holes 4 in a guide as a stencil, the guide is removed from the balloon and the dots 6 are connected by marker or brush, crayon or the like, and the chosen pattern 7 comes to life on the balloon's surface. Depending upon the artistic skill of the worker, either directly or by way of a machine suitably programmed by computer, the pattern 7 can then be enhanced as to detail and color. This is shown in FIG. 3.

According to a further embodiment of the guide 1, strips or wires of metal are adhered to the outside, to further assure that the shaped disposition of the guide is retained for long-term usefulness.

According to an additional embodiment of the guide according to the present invention, aluminum or tin foil is used as the flexible material, in which case the holes which define the intended pattern for stencilling are made by pressing the tool directly through the foil, rather than expanding the spaces that are already present in the fabric of the previous embodiment. This embodiment requires no supplemental shape-retaining structure nor any content of sizing substance.

It will be understood that each of the elements described above, or two or more together, may also find a usefull application in other types of guides differing from the types that have been described above.

While the invention has been illustrated and described as embodied in a guide for image placement using a connect-the-marks technique, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Obviously, the guide for image placement disclosed herein is useful without shaping for the stencilling of flat objects.

What is claimed as new and desired to be protected by Letters Patent is set forth in the appended claims:

1. A connect-the-marks guide for image placement, comprising a sheet of moldable, shape-retaining material, said material being composed of fibers arranged mesh-like in a grid to define a natural fiber spacing of already-present spaces between said mesh-like fibers, and said sheet defining a plurality of holes arranged to suggest a pattern, said holes being an enlargement of selected said already-present spaces formed by expansion of a plurality of said already-present spaces.

2. The guide according to claim 1, further comprising means for shape-retainment in said sheet.

3. The guide according to claim 2, wherein said means for shape-retainment are selected from the group consisting of glue, starch, flour, vinyl, polypropylene, polyethylene, polyethylene terephthalate, polyester, polyacrylate, cellulose, derivatives thereof, metal and combinations thereof.

4. The guide according to claim 1, wherein said sheet has a surface and further comprising means for shape-retainment on said surface.

5. The guide according to claim 4, wherein said means for shape-retainment are selected from the group consisting of glue, starch, flour, vinyl, polypropylene, polyethylene, polyethylene terephthalate, polyester, polyacrylate, cellulose, derivatives thereof, metal and combinations thereof.

6. The guide according to claim 1, wherein said sheet is composed of a material selected from the group consisting of metal, metal foil, plastic, plastic foil, metal-plastic composite and metal-plastic composite foil.

7. The guide according to claim 1, wherein said sheet is composed of a material selected from the group consisting of vinyl, polypropylene, polyethylene, polyethylene terephthalate, polyester, polyacrylate, cellulose, derivatives thereof, and combinations thereof.

8. The guide according to claim 1, wherein said sheet is composed of a material selected from the group consisting of synthetic film, gauze, fabric or sizing material.

9. The guide according to claim 8, wherein said sheet is composed of a material selected from the group consisting of polyester, nylon, viscose, dacron, cotton, cellulose and latex.

10. The guide according to claim 1, further comprising said sheet is shaped to fit against a non-flat object.

11. The guide according to claim 1, for stencilling a pattern onto a balloon, wherein said sheet of moldable, shape-retaining material is composed of buckram, and said sheet is shaped to fit against a balloon.

12. A method of placing an image upon a non-flat surface, comprising providing a moldable, shape-retaining sheet of material, shaping said sheet to fit against a non-flat surface, forming a pattern of holes on said sheet, placing said sheet against said non-flat surface, marking dots on said non-flat surface through said holes on said sheet, removing said sheet from said non-flat surface and drawing a connection between adjacent pairs of dots on said non-flat surface, whereby an image defined by said step of drawing a pattern of holes on said sheet is placed upon said non-flat surface.

13. The method according to claim 12, further comprising means for shape-retainment of said sheet on said sheet.

14. The method according to claim 13, said step of shaping further comprising wetting said sheet of material.

15. The method according to claim 12, further comprising providing means for shape-retainment of said sheet in said sheet.

16. The method according to claim 15, said step of shaping further comprising wetting said sheet of material.

* * * * *